Sept. 26, 1933.     K. HÄSSNER     1,927,981
FOUR-JAW CHUCK FOR DRILLS
Filed Jan. 11, 1932     2 Sheets-Sheet 1
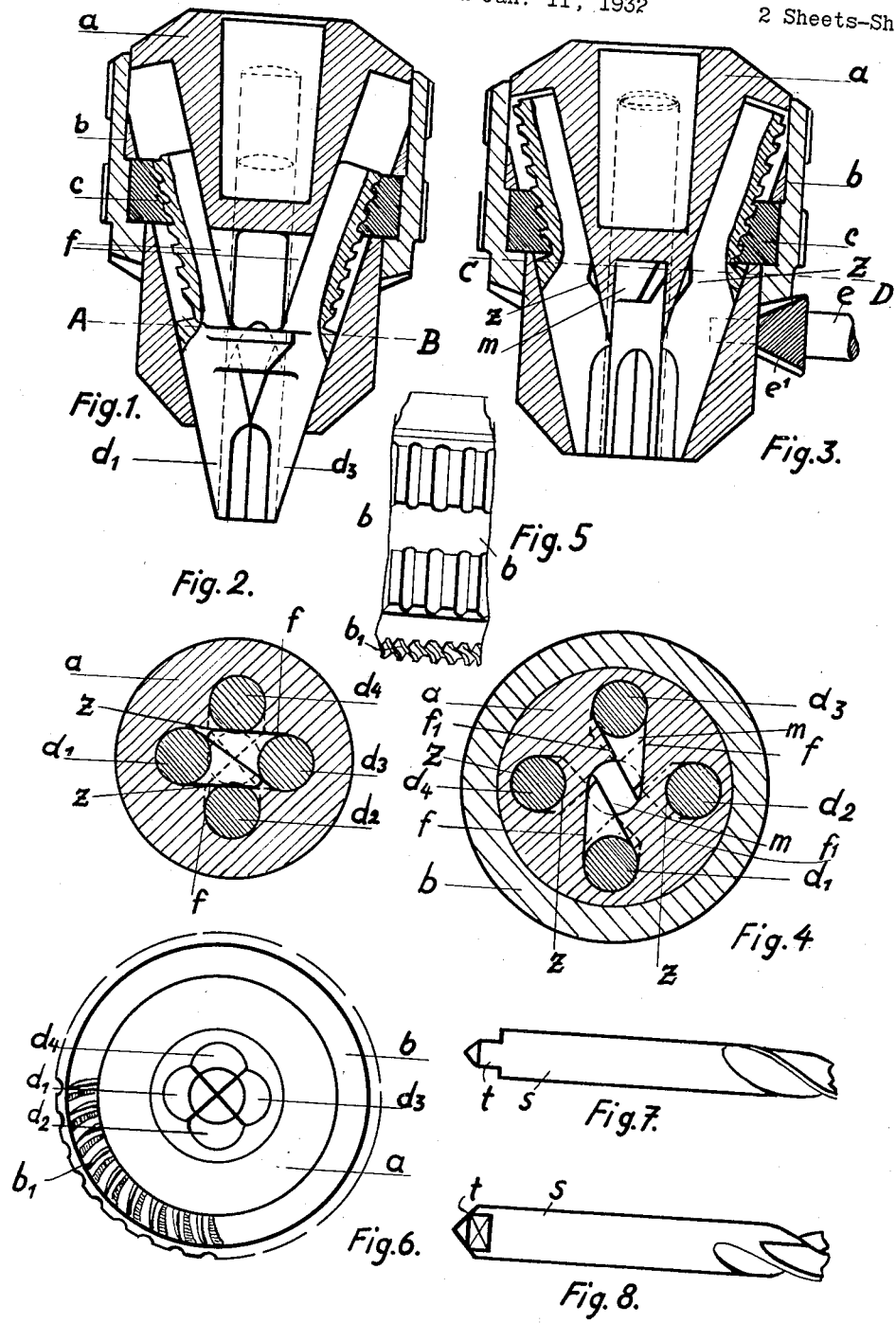

Sept. 26, 1933.  K. HASSNER  1,927,981
FOUR-JAW CHUCK FOR DRILLS
Filed Jan. 11, 1932  2 Sheets-Sheet 2
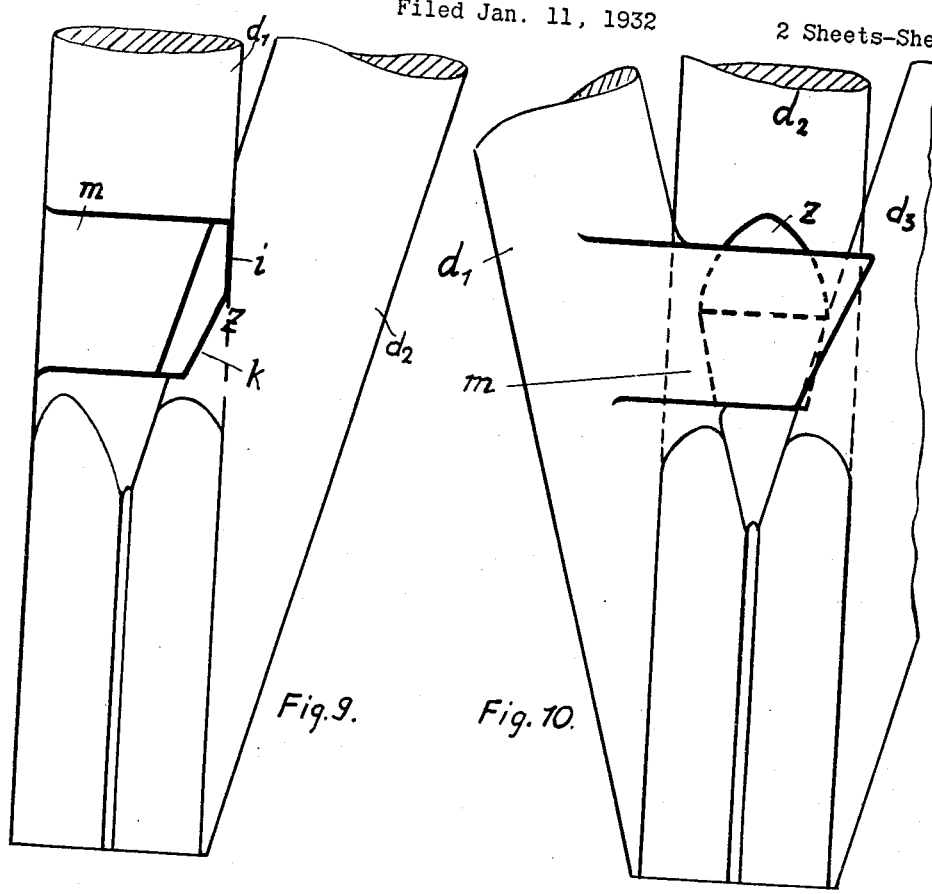
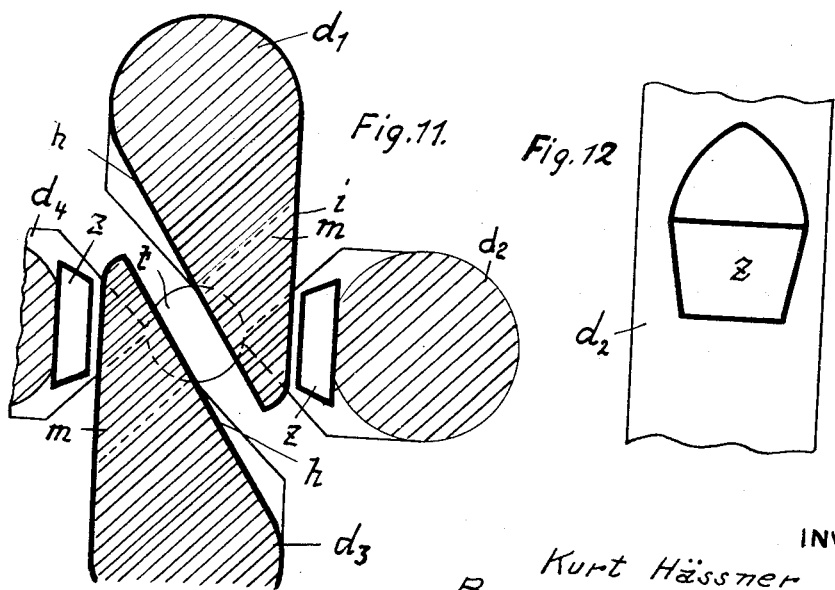
INVENTOR:
Kurt Hässner
By Emil Bönnelycke
Attorney Patented Sept. 26, 1933

1,927,981

UNITED STATES PATENT OFFICE 1,927,981

FOUR JAW CHUCK FOR DRILLS

Kurt Hässner, Gera, Thuringia, Germany

Application January 11, 1932, Serial No. 586,003, and in Germany May 30, 1931

6 Claims. (Cl. 279—61)

This invention relates to a four jaw drill and chuck therefor in which drivers are provided on two clamp jaws, which drivers abut against a driver projection of the drill or other tool. The invention mainly consists in that the drivers are arranged on diagonally opposite lying clamp jaws, in such a way that their points are directed to opposite sides. In this way it is attained that the clamp jaws can be screwed so far out of the chuck, that tools of the smallest diameter may be clamped firmly between the clamp jaws and drivers. A further object of the invention is that while retaining the advantages gained by the arrangement of the drivers, disposed diagonally opposite to obtain a strengthened construction of the drivers by that the surface of the drivers coming to lie against the driver projection of the clamped tool lies tangentially to the cylindrical shaft of the clamp jaws so that the drivers have at the transition point to the clamping jaw, a substantial width. According to the invention the lateral surface of the drivers lying opposite the abutting surface against the tool is preferably bevelled downwardly, whereby the recess of the adjacent clamp jaw coming in engagement with this surface, when screwing the clamp jaws completely out of the chuck, is provided with a corresponding inclined surface, so that the two surfaces may lie against one another firmly. In order to transmit the forces operating on the driver directly onto the chuck the recesses, provided in the body of the chuck for the drivers are preferably so formed that their walls abut against the side surfaces of the drivers for any position of the clamping jaws.

The accompanying drawings show by way of example, a form of construction, according to the invention.

Fig. 1 being a longitudinal section through a four jaw drill chuck with the clamp jaws in the complete outer position of the chuck.

Fig. 2 is a section along the line A—B of Fig. 1.

Fig. 3 is a section corresponding to Fig. 1 with the clamping jaws completely screwed into the chuck.

Fig. 4 is a section through Fig. 3 along the line C—D.

Fig. 5 is a part view of the rings serving to screw the clamping jaws in and out.

Fig. 6 is a view of the chuck from below with the clamping jaws completely screwed out.

Figs. 7 and 8 show views of a spiral drill transposed at right angles to one another, which is flattened at the shaft end.

Fig. 9 illustrates the underneath portion of two adjacent clamping jaws at their extreme position, on an enlarged scale.

Fig. 10 is a section at right angles to Fig. 9, of the lower ends of three clamping jaws.

Fig. 11 is a horizontal section through the clamping jaws with the tool fixed.

Fig. 12 is a part view of one of the two clamping jaws provided with a recess for the adjacent driver.

The chuck body $a$ of the cutter head is provided with four bores inclined relatively to one another in each one of which is inserted a clamping jaw $d^1$, $d^2$, $d^3$, $d^4$. The clamping jaws are provided at their upper portion, in a known manner, with teeth arranged outside, in engagement with a divided ring nut $c$. On the ring nut $c$, presses a grooved outer ring $b$, which is provided at its lower end with curved teeth $b^1$. The ring $b$ may be rotated in the one or the other direction either by hand or by means of a pinion $e^1$, arranged on a key $e$, which pinion is brought into engagement with the curved teeth $b^1$ of the ring. According to the direction of rotation of the outer ring $b$, the clamp jaws $d^1$, $d^2$, $d^3$, $d^4$ are jointly screwed out of the body of the chuck or screwed in.

The clamping jaws are provided at their lower ends with inclined surfaces which form a right angle with one another and the common edge of which abuts against the cylindrical shaft $s$ of the drill or other tool to be clamped. In two oppositely disposed clamping jaws, namely jaws $d^1$ and $d^3$, lateral drivers $m$ are arranged according to the invention of which the surfaces facing one another, come to lie against a driving projection $t$ of the tool shaft $s$, when the tool is being clamped in, whereby a positive drive of the tool is effected.

The driving surfaces coming against the driving projection of the tool form with one of the two inclined surfaces situated at the lower ends of the clamping jaws, an obtuse angle, the drivers $m$ are constructed in such a manner that their surfaces $h$ facing one another, go over tangentially into the cylindrical shaft of the clamping jaws $d^1$ and $d^3$ (Figs. 2, 3 and 11).

The lateral surfaces $i$ of the drivers continue at the upper part also tangentially on the cylindrical shaft of the clamping jaws and are provided with an inclined surface $k$ amounting to about two thirds of the height of the driver so that the lower horizontal surface of the driver is smaller than the upper surface. On the clamping jaws $d^2$ and $d^4$, not provided with drivers, are provided the recesses $z$ at the head of the drivers $m$ of the clamping jaws $d^1$ and $d^3$ (Figs. 9 and 12), which recesses have an angular form to correspond to the external surfaces $i, k$, of the drivers $m$. On screwing out the clamping jaws from the body of the chuck in the extreme end position, the surfaces $i, k$, of the drivers $m$ engage with the recess $z$ of the adjacent clamping jaws $d^2, d^4$, so as to enable the clamping jaws to be screwed out so far that their side surfaces facing one another, lie firmly against each other (Figs. 2 and 9). Inclination $k$ of the drivers renders it possible for the recesses $z$ to be made comparatively small, so that the clamping jaws $d^2, d^4$, are not materially weakened.

The recesses provided in the body chuck $a$ for the drivers $m$ of the clamping jaws $d^1$ and $d^3$ are so formed that their surfaces $f, f^1$ in any position of the clamping jaws $d^1$ and $d^3$ lie against the lateral faces $h, i$ of the drivers $m$ and thus effect a sure guide for the drivers and relief of the clamping jaws carrying them. On completely screwing out the clamping jaws from the body of the chuck $a$, the surfaces $h$ of the drivers $m$ facing one another, lie firmly against each other, whilst the oppositely disposed driver faces $i, k$, engage in the recesses $z$ of the clamping jaws $d^2$ and $d^4$. The chuck may be employed for tools having the smallest possible diameter. Furthermore by strengthened construction of the driver, the risk of a breakage or a premature wearing out is avoided.

The invention is naturally not limited to the construction described; the drivers, the height of which are suitably adapted to the length of the driver projections of the tool to be clamped in may for instance be arranged higher or lower on the clamp jaws.

I claim:—

1. A chuck particularly for drills comprising a chuck body; four clamping jaws adapted to move along inclined bores in said body; and a driver projecting laterally from each of two diagonally arranged clamping jaws so that their points are directed toward opposite sides and the drivers being adapted to contact a driving projection on the drill.

2. A chuck particularly for drills comprising a chuck body; four clamping jaws adapted to move along inclined bores in said body; and a driver on each of two diagonally arranged clamping jaws so that their points are directed toward opposite sides and the drivers being adapted to contact a driving projection on the drill, the driver surfaces which contact the driving projection of the drill forming an obtuse angle with one of the two inclined surfaces abutting against the clamping surface for the shaft of the drill.

3. A chuck according to claim 1 in which the driver surfaces which contact the driving projection of the drill abut tangentially on the shaft of the clamp jaw.

4. A chuck particularly for drills comprising a chuck body; four clamping jaws adapted to move along inclined bores in said body; and a driver on each of two diagonally arranged clamping jaws so that their points are directed toward opposite sides and the drivers being adapted to contact a driving projection on the drill, the two clamping jaws not provided with a driver having a recess therein which the drivers engage when the clamping jaws are screwed out of the chuck body.

5. A chuck particularly for drills comprising a chuck body; four clamping jaws adapted to move along inclined bores in said body; and a driver on each of two diagonally arranged clamping jaws so that their points are directed toward opposite sides and the drivers being adapted to contact a driving projection on the drill, the two clamping jaws not provided with a driver having a recess therein which the drivers engage when the clamping jaws are screwed out of the chuck body, and the lateral surface of the drivers lying opposite the abutting surface against the drill being bevelled downwards and the recess of the adjacent clamping jaw, coming in engagement with the abutting surface when the clamping jaws are completely screwed out of the chuck body, being provided with a corresponding inclined surface.

6. A chuck particularly for drills comprising a chuck body; four clamping jaws adapted to move along inclined bores in said body; and a driver on each of two diagonally arranged clamping jaws so that their points are directed toward opposite sides and the drivers being adapted to contact a driving projection on the drill, the two clamping jaws not provided with a driver having a recess therein which the drivers engage when the clamping jaws are screwed out of the chuck body, and the recesses provided in the chuck body for the drivers being so formed that their surfaces lie against the lateral faces of the drivers in any position of the clamping jaws.

KURT HÄSSNER.